United States Patent Office.

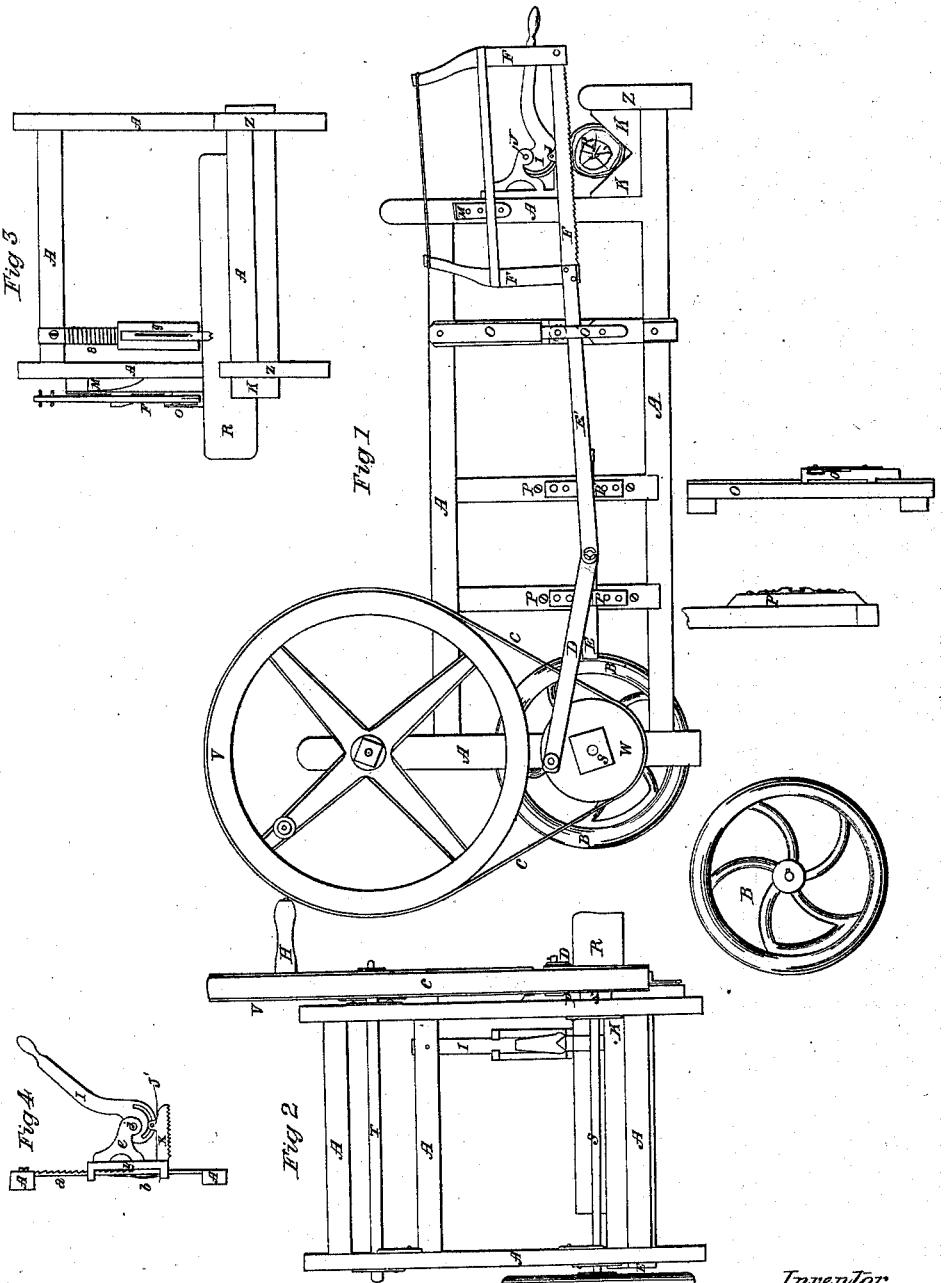

GEORGE JOHNSON, OF DETROIT, MICHIGAN, ASSIGNOR TO HIMSELF, FRANCIS BROSSY, AND ADOLPHUS GAUDRON, OF THE SAME PLACE.

*Letters Patent No. 62,205, dated February 19, 1867.*

IMPROVEMENT IN SAWING MACHINES.

*The Schedule referred to in these Letters Patent and making part of the same.*

TO ALL WHOM IT MAY CONCERN:

Be it known that I, GEORGE JOHNSON, of the city of Detroit, in the county of Wayne, and State of Michigan, have invented a new and improved Machine for Sawing Wood; and I do hereby declare that the following is a full, clear, and exact description thereof, which will enable others skilled in the art to make and use the same, reference being had to the accompanying drawings, forming part of this specification.

Thy nature of my invention consists in applying hand power by means of a driving-wheel, crank, and connecting-rods to a saw, so as to move the same laterally across the wood, and of devices attached to hold the wood and keep the saw pressed down upon it.

A, in the drawings, represents a frame which I make of wood, of the size therein shown, according to the scale. I extend the lower rails of the frame at one end, and support them by two posts, Z Z, between which and the main part of the frame A I secure a right-angled trough, K, upon which the stick of wood R rests. I hold the stick firmly in place by a device shown fully in No. 4 of the drawings, and made as follows: To the upper and lower ends of the frame A, at the end where the wood rests, and near the point of contact with the saw, I secure a pillar, $a$, of cast iron, grooved at its sides and toothed upon its face, so as to receive a cast-iron slide, Y, which is fitted to the sides of the pillar and has a projection at the top to catch upon the teeth of the pillar. A spring, $b$, attached to the bottom of the slide Y, and pressing against the pillar keeps the slide Y against the pillar, and the teeth of the pillar prevent it from rising except when drawn forward. The slide Y is cast with an arm, $e$, in which is a groove to receive the eccentric-headed lever I, which is held in place by a pin, J, passing through the arm $e$, and a hole in the head of the lever I, upon which pin the lever plays. I attach by a knuckle-joint, or other similar device, to the slide Y, a saw-toothed dog, X, with a projecting arm at the top grooved to receive the head of the lever I. Through this projecting arm and a semicircular slot in the head of the lever I, I fasten a pin, J', which guides the motion of the lever I and retains the dog X in a horizontal position, when the wood is removed by sliding the slide Y on the pillar $a$, so as to bring the dog X upon the wood, and pressing down the lever I the teeth of the dog are pressed into the wood, which is thereby firmly held. The moving parts of my machine I make as follows: Upon a shaft, T, running in boxes attached to the head-post of the frame A, I run a spider-driving wheel, V, which is turned by hand by means of the handle H. A band, C, communicates the motion to a crank-wheel, W, running upon a shaft, S, also working in boxes attached to the head-post of the frame A. To the end of the shaft S furthest from the crank-wheel W I attach a cast-iron fly or balance-wheel, B, to give steadiness of motion. To a bolt in the outside face of the crank-wheel W, and at sufficient distance from the centre to give the proper length of cut to the saw, I attach a rod, D, of wrought iron, which has a hole to receive the bolt, and is kept in place by a nut or by a pin passing through the bolt. At its furthest extremity from the wheel W I attach the rod D to a guide-bar, E, which has a bolt or pin firmly fixed in its centre, upon which pin the rod D is fitted. I also fit to the same bolt one end of a carrying-rod, E', also of wrought iron, the other end of which is fastened to the frame of a saw, F, which I make with a frame, as shown in the drawings, but which may be used without, in which case the carrying-rod E' would be fastened to the saw itself. The guide-rod E I make of wrought iron, and cause it to travel in two recessed clamps, P P, which are screwed to uprights of the frame A, which clamps keep it always horizontal. The object of the guide-bar E is to keep the point where the rods D and E' are connected always in the same plane, while allowing the crank motion of the rod D and the downward movement at the saw end of the rod E'. The pressure of the saw F upon the wood I effect by means of a weighted slide, O, which is recessed to admit the rod E', and also a friction-roller, which presses directly upon the rod E'. The rod and roller are kept in place by a removable iron strap fastened outside and bored for the pin upon which the roller revolves. The weighted slide O travels upon a grooved way, O', to which it is loosely fitted, and is made sufficiently heavy to exert the proper pressure upon the saw. Lastly, I fasten to the frame A, above the saw F, a block of wood, M, upon which the saw rests when not in motion.

The machine I have described is operated by hand power, applied to the driving-wheel V, communicated with increased speed to the crank-wheel W, which carries the saw F by means of the connecting-rods D and E', in the manner set forth.

What I claim as my invention, and desire to secure by Letters Patent, is—

The ratchet-bar $a$, and sliding or adjustable frame Y, with the dog X and lever I attached thereto, and arranged to operate as shown and described, for holding the wood.

GEORGE JOHNSON.

Witnesses:
J. W. MEAD,
RALPH O. SMITH.